United States Patent
Li et al.

(10) Patent No.: US 12,155,488 B2
(45) Date of Patent: Nov. 26, 2024

(54) METHOD FOR DETERMINING HARQ FEEDBACK RESOURCE, APPARATUS, AND SYSTEM

(71) Applicant: Huawei Technologies Co., Ltd., Shenzhen (CN)

(72) Inventors: Xiaocui Li, Beijing (CN); Haibo Xu, Beijing (CN); Yifan Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 459 days.

(21) Appl. No.: 17/425,904

(22) PCT Filed: Feb. 13, 2020

(86) PCT No.: PCT/CN2020/075021
§ 371 (c)(1),
(2) Date: Jul. 26, 2021

(87) PCT Pub. No.: WO2020/164532
PCT Pub. Date: Aug. 20, 2020

(65) Prior Publication Data
US 2022/0200742 A1    Jun. 23, 2022

(30) Foreign Application Priority Data
Feb. 13, 2019   (CN) .......................... 201910113110.1

(51) Int. Cl.
*H04L 1/1829* (2023.01)
*H04W 72/044* (2023.01)

(52) U.S. Cl.
CPC ......... *H04L 1/1854* (2013.01); *H04W 72/044* (2013.01)

(58) Field of Classification Search
CPC ... H04L 1/1854; H04L 1/1887; H04L 1/1896; H04L 5/00; H04L 5/0055; H04L 1/1812; H04W 72/044; H04W 72/51
(Continued)

(56) References Cited

U.S. PATENT DOCUMENTS

2018/0287763 A1    10/2018  Baghel et al.
2018/0324772 A1*   11/2018  Babaei .................... H04L 5/00
(Continued)

FOREIGN PATENT DOCUMENTS

AU    2013324453 A1 *  4/2015  ........... H04L 1/1607
CN    1972177 B      *  4/2010
(Continued)

OTHER PUBLICATIONS

Xiaomi Communications, "On support of HARQ for V2x communications," 3GPP TSG RAN WG1 Meeting #94bis, R1-1811420, Chengdu, China, Oct. 8-12, 2018, 2 pages.

*Primary Examiner* — Khaled M Kassim
*Assistant Examiner* — Oladiran Gideon Olaleye
(74) *Attorney, Agent, or Firm* — Conley Rose, P.C.

(57) ABSTRACT

A method for determining a hybrid automatic repeat request (HARQ) feedback resource includes determining, by a transmit end, the HARQ feedback resource of a receive end based on processing capability information of the receive end of a priority of data transmitted between the transmit end and the receive end, where the HARQ feedback resource carries HARQ information corresponding to the data transmitted between the transmit end and the receive end, and sending, by transmit end to the receive end, indication information indicating the HARQ feedback resource.

20 Claims, 4 Drawing Sheets

(58) Field of Classification Search
USPC .......................................................... 370/330
See application file for complete search history.

(56) References Cited

U.S. PATENT DOCUMENTS

2019/0181989 A1 6/2019 Li et al.
2020/0015198 A1 1/2020 Zhao et al.

FOREIGN PATENT DOCUMENTS

| | | | | | |
|---|---|---|---|---|---|
| CN | 101997663 | A | * | 3/2011 | ........... H04L 1/1851 |
| CN | 107734671 | A | | 2/2018 | |
| CN | 108631968 | A | | 10/2018 | |
| CN | 108702258 | A | | 10/2018 | |
| CN | 109075921 | A | * | 12/2018 | ........... H04L 1/1812 |
| EP | 3836446 | A1 | | 6/2021 | |
| TW | 201338437 | A | * | 9/2013 | ........... H04W 72/02 |
| WO | WO-2014094171 | A1 | * | 6/2014 | ........... H04L 1/0003 |
| WO | WO-2018084608 | A2 | * | 5/2018 | ........... H04L 1/0003 |

* cited by examiner

METHOD FOR DETERMINING HARQ FEEDBACK RESOURCE, APPARATUS, AND SYSTEM

CROSS-REFERENCE TO RELATED APPLICATIONS

This application is a U.S. National Stage of International Patent Application No. PCT/CN2020/075021 filed on Feb. 13, 2020, which claims priority to Chinese Patent Application No. 201910113110.1 filed on Feb. 13, 2019, both of which are hereby incorporated by reference in their entireties.

TECHNICAL FIELD

Embodiments of this application relate to the field of communications technologies, and in particular, to a method for determining a hybrid automatic repeat request (hybrid automatic repeat request, HARQ) feedback resource, an apparatus, and a system.

BACKGROUND

In a vehicle to everything (vehicle to everything, V2X) communications system, a transmit end and a receive end may communicate with each other through a sidelink (sidelink). For example, the transmit end may perform unicast communication with one receive end through a sidelink, or may perform multicast communication with a plurality of receive ends through sidelinks. When the transmit end and the receive end perform unicast communication or multicast communication through a sidelink, a HARQ technology is introduced to ensure communication quality and a system throughput. A working principle of the HARQ technology is as follows: The transmit end sends a data packet to the receive end. The receive end receives the data packet sent by the transmit end, and detects whether an error occurs in the received data packet. If no error occurs, the receive end sends a positive acknowledgement (acknowledge, ACK) to the transmit end on a HARQ feedback resource (for example, a physical sidelink feedback channel, PSFCH). After receiving the ACK, the transmit end sends a next data packet. If an error occurs, the receive end sends a negative acknowledgement (non-acknowledge, NACK) to the transmit end on the HARQ feedback resource. After receiving the NACK, the transmit end resends a same data packet.

Currently, the receive end may obtain the HARQ feedback resource of the receive end and send HARQ information on the obtained HARQ feedback resource in the following two manners. Manner 1: The receive end receives a HARQ feedback resource that is determined by a base station for the receive end and that is used to transmit the HARQ information (ACK or NACK), and sends the HARQ information to the transmit end on the HARQ feedback resource. Manner 2: The receive end receives a HARQ feedback resource that is determined by the transmit end for the receive end, and sends the HARQ information to the transmit end on the HARQ feedback resource. In the second implementation, how the transmit end determines the HARQ feedback resource for the receive end needs to be discussed.

SUMMARY

Embodiments of this application provide a method for determining a HARQ feedback resource, an apparatus, and a system, to implement that a transmit end configures the HARQ feedback resource for a receive end.

To achieve the foregoing objectives, the following technical solutions are used in the embodiments of this application.

According to a first aspect, the embodiments of this application provide a method for determining a HARQ feedback resource. The method may include: A transmit end determines a HARQ feedback resource of a receive end based on processing capability information of the receive end, or a priority of data transmitted between the transmit end and the receive end, or processing capability information of the receive end and a priority of data transmitted between the transmit end and the receive end. The HARQ feedback resource of the receive end is used to carry HARQ information corresponding to the data transmitted between the transmit end and the receive end. The transmit end sends indication information used to indicate the HARQ feedback resource of the receive end to the receive end, so that the receive end feeds back the HARQ information to the transmit end on the determined HARQ feedback resource based on the indication information.

Based on the method according to the first aspect, the transmit end may determine, based on a processing capability of the receive end and/or the priority of the data sent by the transmit end to the receive end, the resource used by the receive end to feed back the HARQ information, so that the receive end feeds back the HARQ information on the resource determined by the transmit end. The method provided in the first aspect provides a feasible solution for the transmit end to determine the HARQ feedback resource of the receive end.

With reference to the first aspect, in a first embodiment of the first aspect, the processing capability information of the receive end is used to indicate a processing time of the receive end from a moment of receiving data sent by the transmit end to a moment of sending, to the transmit end, the HARQ information corresponding to the data. According to this embodiment, a specific processing time from a moment of detecting, by the receive end, data received by the receive end to a moment of feeding back the HARQ information corresponding to the data may be used as the processing capability of the receive end. This is simple and easy to implement.

With reference to the first embodiment of the first aspect, in a second embodiment of the first aspect, a time interval between the HARQ feedback resource of the receive end and a resource location at which the receive end receives the data sent by the transmit end is greater than or equal to the processing time of the receive end. According to this embodiment, the HARQ feedback resource of the receive end may be synchronized with the processing time of the receive end, or the HARQ feedback resource of the receive end may be configured after the processing time of the receive end, to ensure that the HARQ feedback resource determined for the receive end meets the processing capability of the receive end.

With reference to the first aspect, in a third embodiment of the first aspect, the processing capability information of the receive end is used to indicate a processing capability level of the receive end from a moment of receiving data sent by the transmit end to a moment of sending, to the transmit end, the HARQ information corresponding to the data. The receive end may include a terminal group, the terminal group may include at least two terminal devices, and processing capability levels of different terminal devices may be the same or may be different. According to this embodiment, the processing capability level may be used to represent a processing capability of a type of terminal device from a moment of detecting data received by the terminal device to a moment of feeding back the HARQ information corresponding to the data.

With reference to the third embodiment of the first aspect, in a fourth embodiment of the first aspect, there is a correspondence between the processing capability level of the receive end and a resource pool. The resource pool includes one or more time-frequency resources. That the transmit end determines a time-frequency resource used by the receive end to perform HARQ feedback based on processing capability information of the receive end includes: The transmit end determines the processing capability level of the receive end based on the processing capability information of the receive end. The transmit end determines the HARQ feedback resource of the receive end from the resource pool corresponding to the processing capability level of the receive end based on the processing capability level of the receive end and the correspondence.

According to this embodiment, the resource pool corresponding to the processing capability level of the terminal device may be configured, and the HARQ feedback resource of the terminal device is selected from the resource pool. This is simple and easy to implement.

With reference to the third embodiment of the first aspect or the fourth embodiment of the first aspect, in a fifth embodiment of the first aspect, the receive end includes the terminal group, and the terminal group includes a first terminal device and a second terminal device. A processing capability level of the first terminal device is a first processing capability level, and a processing capability level of the second terminal device is a second processing capability level. When a processing capability of a terminal device at the first processing capability level is higher than a processing capability of a terminal device at the second processing capability level, a time interval between a HARQ feedback resource of the first terminal device and a resource location at which the first terminal device receives data sent by the transmit end is less than a time interval between a HARQ feedback resource of the second terminal device and a resource location at which the second terminal device receives the data sent by the transmit end.

According to this embodiment, different HARQ feedback resources may be determined for terminal devices at different processing capability levels. For example, a HARQ feedback resource of a terminal device having a higher processing capability is located ahead of a HARQ feedback resource of a terminal device having a lower processing capability. In this way, the terminal device having the higher processing capability can quickly and timely feed back HARQ information.

With reference to any one of the first aspect or the embodiments of the first aspect, in a sixth embodiment of the first aspect, the receive end includes a terminal group, and the terminal group includes a first terminal device and a second terminal device. Data transmitted between the transmit end and the first terminal device is first data, and data transmitted between the transmit end and the second terminal device is second data. When a priority of the first data is higher than a priority of the second data, a time interval between a HARQ feedback resource of the first terminal device and a resource location at which the first terminal device receives the first data is less than a time interval between a HARQ feedback resource of the second terminal device and a resource location at which the second terminal device receives the second data.

According to this embodiment, the HARQ feedback resource may be determined for the terminal device based on the priority of the data sent by the transmit end to the terminal device. For example, if the priority of the data is high, the HARQ feedback resource of the terminal device is in the front. If the priority of the data is low, the HARQ feedback resource of the terminal device is in the back. In this way, the HARQ feedback resource of the terminal device can be determined based on the priority of the transmitted data, to meet a data transmission requirement.

With reference to any one of the first aspect or the embodiments of the first aspect, in a seventh embodiment of the first aspect, the method further includes: The transmit end receives, on the HARQ feedback resource of the receive end, the HARQ information sent by the receive end. According to this embodiment, the transmit end may receive, on the HARQ feedback resource determined by the transmit end, the HARQ information sent by the receive end, to ensure accuracy of the received HARQ information.

With reference to any one of the first aspect or the embodiments of the first aspect, in an eighth embodiment of the first aspect, the method further includes: The transmit end receives a radio resource control RRC message sent by the receive end. The RRC message carries the processing capability information of the receive end. According to this embodiment, the receive end may send the processing capability information of the receive end to the transmit end by using the RRC message. In this way, the transmit end can learn of a processing capability information of a peer end by using an existing procedure, thereby reducing signaling overheads.

According to a second aspect, this application provides a communications apparatus. The communications apparatus may be a transmit end, or a chip or a system on chip in the transmit end, or may be a function module that is in the transmit end and that is configured to implement the method according to any one of the first aspect or the possible designs of the first aspect. The communications apparatus may implement a function performed by the transmit end in any one of the first aspect or the embodiments of the first aspect, and the function may be implemented by hardware executing corresponding software. The hardware or the software includes one or more modules corresponding to the foregoing function. For example, the communications apparatus may include a processing unit and a sending unit.

The processing unit is configured to determine a HARQ feedback resource of a receive end based on processing capability information of the receive end, or a priority of data transmitted between the communications apparatus and the receive end, or processing capability information of the receive end and a priority of data transmitted between the communications apparatus and the receive end. The HARQ feedback resource of the receive end is used to carry HARQ information corresponding to the data transmitted between the communications apparatus and the receive end.

The sending unit is configured to send, to the receive end, indication information used to indicate the HARQ feedback resource of the receive end, so that the receive end feeds back the HARQ information to the communications apparatus on the determined HARQ feedback resource based on the indication information.

With reference to the second aspect, in a first embodiment of the second aspect, the processing capability information of the receive end is used to indicate a processing time of the receive end from a moment of receiving data sent by the communications apparatus to a moment of sending, to the communications apparatus, the HARQ information corresponding to the data. According to this embodiment, a specific processing time from a moment of detecting, by the receive end, data received by the receive end to a moment of feeding back the HARQ information corresponding to the data may be used as the processing capability of the receive end. This is simple and easy to implement.

With reference to the first embodiment of the second aspect, in a second embodiment of the second aspect, a time interval between the HARQ feedback resource of the receive end and a resource location at which the receive end receives the data sent by the communications apparatus is greater than or equal to the processing time of the receive end. According to this embodiment, the HARQ feedback resource of the receive end may be synchronized with the processing time of the receive end, or the HARQ feedback resource of the receive end may be configured after the processing time of the receive end, to ensure that the HARQ feedback resource determined for the receive end meets the processing capability of the receive end.

With reference to the second aspect, in a third embodiment of the second aspect, the processing capability information of the receive end is used to indicate a processing capability level of the receive end from a moment of receiving data sent by the communications apparatus to a moment of sending, to the communications apparatus, the HARQ information corresponding to the data. The receive end may include a terminal group, the terminal group may include at least two terminal devices, and processing capability levels of different terminal devices may be the same or may be different. According to this embodiment, the processing capability level may be used to represent a processing capability of a type of terminal device from a moment of detecting data received by the terminal device to a moment of feeding back the HARQ information corresponding to the data.

With reference to the third embodiment of the second aspect, in a fourth embodiment of the second aspect, there is a correspondence between the processing capability level of the receive end and a resource pool. The resource pool includes one or more time-frequency resources. The processing unit is specifically configured to: determine the processing capability level of the receive end based on the processing capability information of the receive end; and determine the HARQ feedback resource of the receive end from the resource pool corresponding to the processing capability level of the receive end based on the processing capability level of the receive end and the correspondence. According to this embodiment, the resource pool corresponding to the processing capability level of the terminal device may be configured, and the HARQ feedback resource of the terminal device is selected from the resource pool. This is simple and easy to implement.

With reference to the third embodiment of the second aspect or the fourth embodiment of the second aspect, in a fifth embodiment of the second aspect, the receive end includes the terminal group, and the terminal group includes a first terminal device and a second terminal device. A processing capability level of the first terminal device is a first processing capability level, and a processing capability level of the second terminal device is a second processing capability level. When a processing capability of a terminal device at the first processing capability level is higher than a processing capability of a terminal device at the second processing capability level, a time interval between a HARQ feedback resource of the first terminal device and a resource location at which the first terminal device receives data sent by the communications apparatus is less than a time interval between a HARQ feedback resource of the second terminal device and a resource location at which the second terminal device receives the data sent by the communications apparatus.

According to this embodiment, different HARQ feedback resources may be determined for terminal devices at different processing capability levels. For example, a HARQ feedback resource of a terminal device having a higher processing capability is located ahead of a HARQ feedback resource of a terminal device having a lower processing capability. In this way, the terminal device having the higher processing capability can quickly and timely feed back HARQ information.

With reference to any one of the second aspect or the embodiments of the second aspect, in a sixth embodiment of the first aspect, the receive end includes the terminal group, and the terminal group includes a first terminal device and a second terminal device. Data transmitted between the communications apparatus and the first terminal device is first data, and data transmitted between the communications apparatus and the second terminal device is second data. When a priority of the first data is higher than a priority of the second data, a time interval between a HARQ feedback resource of the first terminal device and a resource location at which the first terminal device receives the first data is less than a time interval between a HARQ feedback resource of the second terminal device and a resource location at which the second terminal device receives the second data.

According to this embodiment, the HARQ feedback resource may be determined for the terminal device based on the priority of the data sent by the communications apparatus to the terminal device. For example, if the priority of the data is high, the HARQ feedback resource of the terminal device is in the front. If the priority of the data is low, the HARQ feedback resource of the terminal device is in the back. In this way, the HARQ feedback resource of the terminal device can be determined based on the priority of the transmitted data, to meet a data transmission requirement.

With reference to any one of the second aspect or the embodiments of the second aspect, in a seventh embodiment of the second aspect, the communications apparatus further includes a receiving unit. The receiving unit is configured to receive, on the HARQ feedback resource of the receive end, the HARQ information sent by the receive end. According to this embodiment, the communications apparatus may receive, on the HARQ feedback resource determined by the transmit end, the HARQ information sent by the receive end, to ensure accuracy of the received HARQ information.

With reference to any one of the second aspect or the embodiments of the second aspect, in an eighth embodiment of the second aspect, the communications apparatus further includes a receiving unit. The receiving unit is configured to receive a radio resource control RRC message sent by the receive end. The RRC message carries the processing capability information of the receive end. According to this embodiment, the receive end may send the processing capability information of the receive end to the communications apparatus by using the RRC message, thereby reducing signaling overheads.

According to a third aspect, a communications apparatus is provided. The communications apparatus may be a transmit end, or a chip or a system on chip in the transmit end. The communications apparatus may implement a function performed by the transmit end in any one of the first aspect or the embodiments of the first aspect, and the function may be implemented by hardware. For example, in a possible design, the communications apparatus may include a processor and a communications interface.

The processor is configured to determine a HARQ feedback resource of a receive end based on processing capability information of the receive end, or a priority of data transmitted between the receive end and the communications apparatus, or processing capability information of the receive end and a priority of data transmitted between the receive end and the communications apparatus. The HARQ feedback resource of the receive end is used to carry HARQ information corresponding to the data transmitted between the communications apparatus and the receive end.

The communications interface is configured to send, to the receive end, indication information used to indicate the HARQ feedback resource of the receive end, so that the receive end feeds back the HARQ information to the communications apparatus on the determined HARQ feedback resource based on the indication information.

With reference to the third aspect, in a first embodiment of the third aspect, the processing capability information of the receive end is used to indicate a processing time of the receive end from a moment of receiving data sent by the communications apparatus to a moment of sending, to the communications apparatus, the HARQ information corresponding to the data. According to this embodiment, a specific processing time from a moment of detecting, by the receive end, data received by the receive end to a moment of feeding back the HARQ information corresponding to the data may be used as the processing capability of the receive end. This is simple and easy to implement.

With reference to the first embodiment of the third aspect, in a second embodiment of the third aspect, a time interval between the HARQ feedback resource of the receive end and a resource location at which the receive end receives the data sent by the communications apparatus is greater than or equal to the processing time of the receive end. According to this embodiment, the HARQ feedback resource of the receive end may be synchronized with the processing time of the receive end, or the HARQ feedback resource of the receive end may be configured after the processing time of the receive end, to ensure that the HARQ feedback resource determined for the receive end meets the processing capability of the receive end.

With reference to the third aspect, in a third embodiment of the third aspect, the processing capability information of the receive end is used to indicate a processing capability level of the receive end from a moment of receiving data sent by the communications apparatus to a moment of sending, to the communications apparatus, the HARQ information corresponding to the data. The receive end may include a terminal group, the terminal group may include at least two terminal devices, and processing capability levels of different terminal devices may be the same or may be different. According to this embodiment, the processing capability level may be used to represent a processing capability of a type of terminal device from a moment of detecting data received by the terminal device to a moment of feeding back the HARQ information corresponding to the data.

With reference to the third embodiment of the third aspect, in a fourth embodiment of the third aspect, there is a correspondence between the processing capability level of the receive end and a resource pool. The resource pool includes one or more time-frequency resources. The processor is specifically configured to: determine the processing capability level of the receive end based on the processing capability information of the receive end; and determine the HARQ feedback resource of the receive end from the resource pool corresponding to the processing capability level of the receive end based on the processing capability level of the receive end and the correspondence. According to this embodiment, the resource pool corresponding to the processing capability level of the terminal device may be configured, and the HARQ feedback resource of the terminal device is selected from the resource pool. This is simple and easy to implement.

With reference to the third embodiment of the third aspect or the fourth embodiment of the third aspect, in a fifth embodiment of the third aspect, the receive end includes the terminal group, and the terminal group includes a first terminal device and a second terminal device. A processing capability level of the first terminal device is a first processing capability level, and a processing capability level of the second terminal device is a second processing capability level. When a processing capability of a terminal device at the first processing capability level is higher than a processing capability of a terminal device at the second processing capability level, a time interval between a HARQ feedback resource of the first terminal device and a resource location at which the first terminal device receives data sent by the communications apparatus is less than a time interval between a HARQ feedback resource of the second terminal device and a resource location at which the second terminal device receives the data sent by the communications apparatus.

According to this embodiment, different HARQ feedback resources may be determined for terminal devices at different processing capability levels. For example, a HARQ feedback resource of a terminal device having a higher processing capability is located ahead of a HARQ feedback resource of a terminal device having a lower processing capability. In this way, the terminal device having the higher processing capability can quickly and timely feed back HARQ information.

With reference to any one of the third aspect or the embodiments of the third aspect, in a sixth embodiment of the third aspect, the receive end includes the terminal group, and the terminal group includes a first terminal device and a second terminal device. Data transmitted between the communications apparatus and the first terminal device is first data, and data transmitted between the communications apparatus and the second terminal device is second data. When a priority of the first data is higher than a priority of the second data, a time interval between a HARQ feedback resource of the first terminal device and a resource location at which the first terminal device receives the first data is less than a time interval between a HARQ feedback resource of the second terminal device and a resource location at which the second terminal device receives the second data.

According to this embodiment, the HARQ feedback resource may be determined for the terminal device based on the priority of the data sent by the communications apparatus to the terminal device. For example, if the priority of the data is high, the HARQ feedback resource of the terminal device is in the front. If the priority of the data is low, the HARQ feedback resource of the terminal device is in the back. In this way, the HARQ feedback resource of the terminal device can be determined based on the priority of the transmitted data, to meet a data transmission requirement.

With reference to any one of the third aspect or the embodiments of the third aspect, in a seventh embodiment of the third aspect, the communications interface is further configured to receive, on the HARQ feedback resource of the receive end, the HARQ information sent by the receive end. According to this embodiment, the communications apparatus may receive, on the HARQ feedback resource determined by the transmit end, the HARQ information sent by the receive end, to ensure accuracy of the received HARQ information.

With reference to any one of the third aspect or the embodiments of the third aspect, in an eighth embodiment of the third aspect, the communications interface is further configured to receive a radio resource control RRC message sent by the receive end. The RRC message carries the processing capability information of the receive end. According to this embodiment, the receive end may send the processing capability information of the receive end to the communications apparatus by using the RRC message, thereby reducing signaling overheads.

According to a fourth aspect, a computer-readable storage medium is provided. The computer-readable storage medium may be a readable non-volatile storage medium, and the computer-readable storage medium stores instructions. When the instructions are run on a computer, the computer is enabled to perform the method for determining a HARQ feedback resource according to any one of the first aspect or the possible designs of the aspect.

According to a fifth aspect, a computer program product including instructions is provided. When the computer program product is run on a computer, the computer is enabled to perform the method for determining a HARQ feedback resource according to any one of the first aspect or the possible designs of the aspect.

According to a sixth aspect, a communications apparatus is provided. The communications apparatus may be a transmit end, or a chip or a system on chip in the transmit end. The communications apparatus includes one or more processors and one or more memories. The one or more memories are coupled to the one or more processors. The one or more memories are configured to store computer program code. The computer program code includes computer instructions, and when the one or more processors execute the computer instructions, the communications apparatus is enabled to perform the method for determining a HARQ feedback resource according to any one of the first aspect or the possible designs of the first aspect.

For technical effects achieved by any one of the design manners of the third aspect to the sixth aspect, refer to technical effects achieved by any one of the first aspect or the possible designs of the first aspect. Details are not described again.

According to a seventh aspect, the embodiments of this application provide a system for determining a HARQ feedback resource. The system may include a receive end and the transmit end according to any one of the second aspect to the sixth aspect.

DESCRIPTION OF EMBODIMENTS

The following describes implementations of embodiments of this application in detail with reference to accompanying drawings in this specification.

A method for determining a HARQ feedback resource provided in the embodiments of this application may be used in any communications system supporting V2X communication. The communications system may be a 3rd generation partnership project (3rd generation partnership project, 3GPP) communications system, for example, a long term evolution (long term evolution, LTE) system; or may be a 5th generation (5th generation, 5G) mobile communications system or a new radio (new radio, NR) system; or may be a non-3GPP communications system. This is not limited. The following uses FIG. 1 as an example to describe the method provided in the embodiments of this application.

Figure 1:
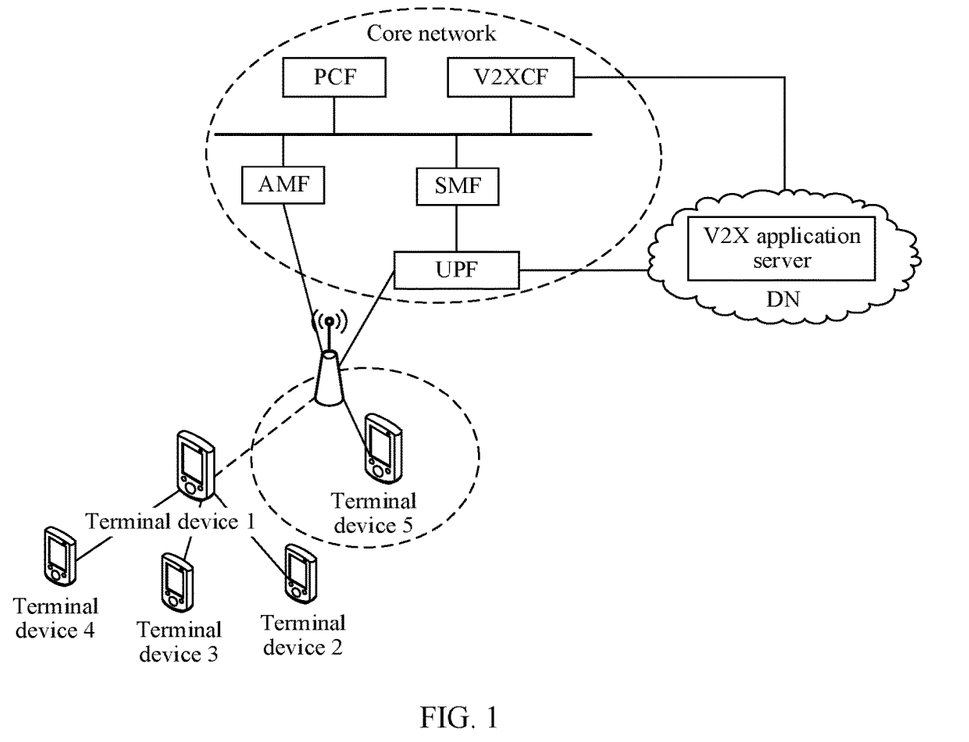
FIG. 1 is a schematic diagram of a communications system according to an embodiment of this application.

FIG. 1 is a schematic architectural diagram of a communications system according to the embodiments of this application. As shown in FIG. 1, the communications system may include a plurality of terminal devices (a terminal device 1, a terminal device 2, a terminal device 3, a terminal device 4, and a terminal device 5 shown in FIG. 1), an access network device, a core network, and a data network (data network, DN). The core network may include but is not limited to an access and mobility management function (access and mobility management function, AMF), a V2X control function (V2X control function, V2XCF), a policy control function (policy control function, PCF), a session management function (session management function, SMF), a user plane function (user plane function, UPF), and the like. The DN may include a V2X application server (application service, APP service). For functions of network elements included in the core network and the DN, refer to descriptions in the prior art. Details are not described again.

The terminal device in FIG. 1 may further be referred to as user equipment (user equipment, UE) or a terminal (terminal), and includes but is not limited to an in-vehicle terminal device, a mobile phone (mobile phone), a tablet computer, a computer with a wireless transceiver function, a smart gas station, a smart signal light, or the like. In the system shown in FIG. 1, the terminal device may be located in a coverage area of the access network device, and receive a service provided by the access network device for the terminal device; or may be located outside a coverage area of the access network device. The terminal device may interact with the access network device through a radio interface (for example, a Uu interface), and then access a network through the access network device. As shown in FIG. 1, the terminal device 1 and the terminal device 5 may interact with the access network device through the Uu interface, and access the network through the access network device. The terminal device may also perform V2X communication with another terminal device around the terminal device through a direct link (for example, a sidelink (sidelink)). For example, as shown in FIG. 1, the terminal device 1 may send data of a V2X application to the terminal device 2, the terminal device 3, and the terminal device 4 that are around the terminal device 1 in a multicast manner, or may send data of a V2X application to a specific terminal device (for example, a terminal device 2, a terminal device 3, or a terminal device 4) in a unicast manner.

In a process in which the terminal device performs the V2X communication with the another terminal device, a resource used for the V2X communication needs to be allocated to the terminal device in the following two modes: One is a model 1, and the access network device allocates a resource used for the V2X communication to the terminal device; and the other is a model 2, and the terminal device determines a resource used for the V2X communication, so that the terminal device performs the V2X communication with the another terminal device on the allocated resource. The resource allocated for the terminal device may include a HARQ feedback resource used to carry HARQ information, and the terminal device may feed back, on the allocated resource, HARQ information corresponding to data transmitted through the sidelink, and the like. It should be noted that, if the terminal device performing the V2X communication is not in the coverage area of the access network device, the access network device cannot provide a service for the terminal device, and cannot allocate the resource used for the V2X communication to the terminal device by using the model 1, but can allocate the resource used for the V2X communication to the terminal device only by using the model 2.

In the model 2, that the terminal device determines a resource used for the V2X communication may include: The terminal device that sends the data determines the resource of the terminal device that receives the data, or the terminal device that receives the data determines the resource. In the embodiments of this application, only how the terminal device (or referred to as a transmit end) that sends data determines the HARQ feedback resource of the terminal device (or referred to as a receive end) that receives data in the model 2 is used as an example for description. For a process in which the transmit end determines a resource of another type for the receive end, refer to descriptions in the embodiments of this application. For example:

In the communications system shown in FIG. 1, the transmit end may determine the HARQ feedback resource for the receive end based on processing capability information of the receive end, or a priority of data transmitted between the receive end and the transmit end, or processing capability information of the receive end and a priority of data transmitted between the receive end and the transmit end, so that after detecting the received data, the receive end feeds back, on the determined HARQ feedback resource, HARQ information corresponding to the data. For example, as shown in FIG. 1, the terminal device 1 and the terminal device 2 are not in the coverage area of the access network device. When the terminal device 1 sends data to the terminal device 2 through the sidelink, the terminal device 1 may determine a HARQ feedback resource for the terminal device 2 based on processing capability information of the terminal device 2, or a priority of data transmitted between the terminal device 1 and the terminal device 2, or processing capability information of the terminal device 2 and a priority of data transmitted between the terminal device 2 and the terminal device 1, so that the terminal device 2 detects the received data and generates corresponding HARQ information, and then sends the HARQ information to the terminal device 1 on the determined HARQ feedback resource. Specifically, for the implementation process, refer to descriptions in the embodiments corresponding to FIG. 3.

It should be noted that FIG. 1 is merely an example of the accompanying drawing, a quantity of devices included in FIG. 1 is not limited, and in addition to the devices shown in FIG. 1, the communications architecture may further include another device. In addition, a name of each device in FIG. 1 is not limited. In addition to the name shown in FIG. 1, each device may be named another name. This is not limited.

Figure 2:
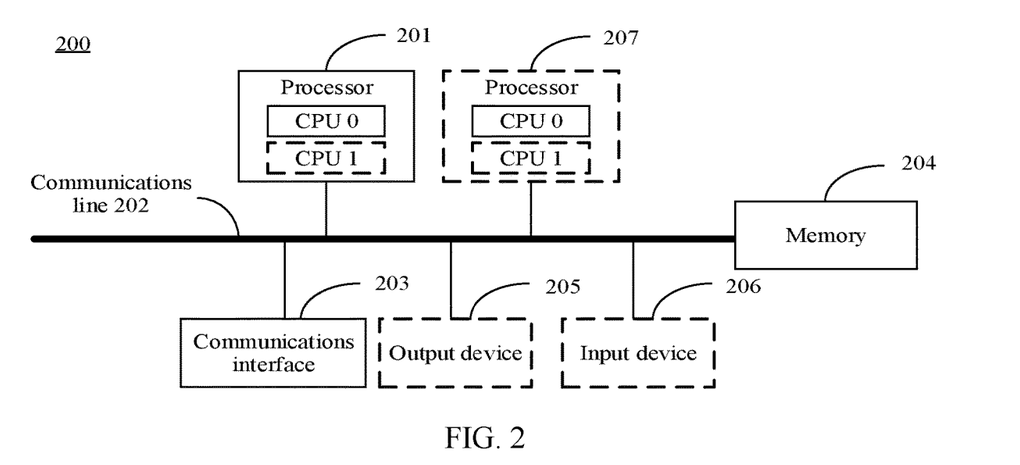
FIG. 2 is a schematic composition diagram of a communications apparatus according to an embodiment of this application.

During specific implementation, the devices shown in FIG. 1, for example, the terminal device, may have the components shown in FIG. 2. FIG. 2 is a schematic composition diagram of a communications apparatus 200 according to the embodiments of this application. The communications apparatus 200 may be a terminal device, or a chip or a system on chip in a terminal device. As shown in FIG. 2, the communications apparatus 200 may include a processor 201, a communications line 202, and a communications interface 203. Further, the communications apparatus 200 may further include a memory 204. The processor 201, the memory 204, and the communications interface 203 may be connected to each other through the communications line 202.

The processor 201 may be a central processing unit (central processing unit, CPU), a general-purpose processor, a network processor (network processor, NP), a digital signal processor (digital signal processing, DSP), a microprocessor, a microcontroller, a programmable logic device (programmable logic device, PLD), or any combination thereof. The processor may alternatively be any other apparatus having a processing function, for example, a circuit, a component, or a software module. In an example, the processor 201 may include one or more CPUs, such as a CPU 0 and a CPU 1 in FIG. 2.

The communications line 202 may include a path, configured to transmit information between the components included in the communications apparatus.

The communications interface 203 may be configured to communicate with another device or a communications network (for example, the Ethernet, a radio access network (radio access network, RAN), or a wireless local area network (wireless local area networks, WLAN)). The communications interface 203 may be a module, a circuit, a transceiver, or any apparatus that can implement communication. The communications interface 203 may support different RATs. For example, the communications interface 203 may support an LTE technology and/or an NR technology. The processor 201 may use the LTE technology and/or the NR technology to send a message that is of a V2X application and that is generated by the processor 201 through the communications interface 203.

The memory 204 may include the database shown in FIG. 1, and may be a read-only memory (read-only memory, ROM) or another type of static storage device that can store static information and/or instructions, or may be a random access memory (random access memory, RAM) or another type of dynamic storage device that can store information and/or instructions, or may further be an electrically erasable programmable read-only memory (electrically erasable programmable read-only memory, EEPROM), a compact disc read-only memory (compact disc read-only memory, CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. This is not limited thereto. The memory 204 may exist independent of the processor 201, or may be integrated with the processor 201. The memory 204 may be configured to store instructions, a program code, or the like that can implement the method for determining the HARQ feedback resource provided in the following embodiments of this application. The processor 201 may invoke and execute the instructions or the program code stored in the memory 204, to implement the method for determining the HARQ feedback resource provided in the following embodiments of this application.

To improve a processing capability of the communications apparatus 200, in an implementation, the communications apparatus 200 may include a plurality of processors. For example, in addition to the processor 201 in FIG. 2, the communications apparatus 200 may further include a processor 207. In still another possible implementation, the communications apparatus 200 may further include an output device 205 and an input device 206. The input device 206 may be a device such as a keyboard, a mouse, a microphone, or a joystick, and the output device 205 may be a device such as a display or a speaker (speaker).

It should be noted that the communications apparatus 200 may be a general-purpose device or a dedicated device. For example, the communications apparatus 200 may be a desktop computer, a portable computer, a network server, a mobile phone, a tablet computer, a wireless terminal device, an embedded device, a chip system, or a device having a structure similar to that in FIG. 2. A type of the communications apparatus 200 is not limited in the embodiments of this application. In the embodiments of this application, the chip system may include a chip, or may include a chip and another discrete component. In addition, a structure of the device shown in FIG. 2 does not constitute a limitation on the communications apparatus. In addition to the components shown in FIG. 2, the communications apparatus may include more or fewer components than those shown in the figure, or combine some components, or have different component arrangements.

With reference to the system shown in FIG. 1, the following describes a method for determining a HARQ feedback resource according to the embodiments of this application. Each device mentioned in the following method embodiment may have components shown in FIG. 2, and details are not described again. In addition, in the following embodiments of this application, names of messages between network elements, names of parameters in messages, or the like are merely examples, and there may be other names during specific implementation. This is not specifically limited in the embodiments of this application.

Figure 3:
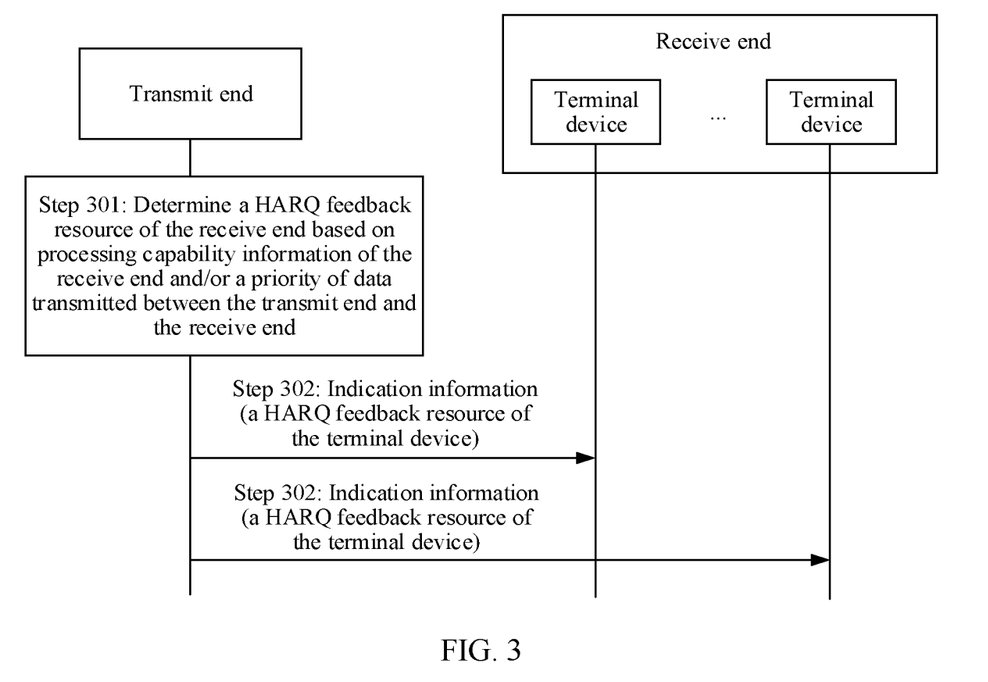
FIG. 3 is a flowchart of a method for determining a HARQ feedback resource according to an embodiment of this application.

FIG. 3 shows a method for determining a HARQ feedback resource according to the embodiments of this application. As shown in FIG. 3, the method for determining the HARQ feedback resource may include the following steps.

Step 301: A transmit end determines a HARQ feedback resource of a receive end based on processing capability information of the receive end and/or a priority of data transmitted between the transmit end and the receive end.

The transmit end and the receive end are relative concepts. The transmit end may be any terminal device that sends data in FIG. 1, and the data may be data of a V2X application or data of another type. The V2X application may be any one of the following applications: a vehicle to vehicle (vehicle to vehicle, V2V) application, a vehicle to person (vehicle to person, V2P) application, a vehicle to network (vehicle to network, V2N) application, a vehicle to infrastructure (vehicle to infrastructure, V2I) application, and the like. The receive end is a terminal device or a terminal group that receives the data sent by the transmit end, and the terminal device group may include at least two terminal devices. For example, as shown in FIG. 1, if the terminal device 1 sends data to the terminal device 2, the terminal device 3, and the terminal device 4, the terminal device 1 may be the transmit end, and the terminal device 2, the terminal device 3, and the terminal device 4 may be receive ends. Correspondingly, if the terminal device 2 sends data to the terminal device 1, the terminal device 2 is the transmit end, and the terminal device 1 is the receive end.

The HARQ feedback resource of the receive end may be used to carry HARQ information corresponding to data transmitted between the transmit end and the receive end. Alternatively, the HARQ feedback resource of the receive end may be described as a time-frequency resource or a time domain resource carrying HARQ information corresponding to data transmitted between the transmit end and the receive end. Alternatively, the HARQ feedback resource of the receive end may be described as a physical sidelink feedback channel (physical sidelink feedback channel, PSFCH) resource of the receive end. The HARQ information may be ACK information or NACK information. When the receive end correctly receives the data sent by the transmit end, the HARQ information is the ACK information. When the receive end does not correctly receive the data sent by the transmit end, the HARQ information is the NACK information or discontinuous transmission (discontinuous transmission, DTX) information.

The processing capability information of the transmit end may be used to indicate a processing time from a moment of receiving, by the receive end, data sent by the transmit end to a moment of sending, to the transmit end, HARQ information corresponding to the data; and may be further used to indicate a processing capability level from a moment of receiving, by the receive end, the data sent by the transmit end to a moment of sending, to the transmit end, the HARQ information corresponding to the data. Processing capability levels of different receive ends may be different, or may be the same. In the embodiments of this application, there may be a plurality of processing capability levels, and the processing capability levels may be represented by numbers. For example, the processing capability levels may be classified into three levels: a level 1, a level 2, and a level 3. A terminal device with a high processing capability level has a relatively strong processing capability, and a terminal device with a low processing capability level has a relatively weak processing capability.

For example, the transmit end may receive a radio resource control (radio resource control, RRC) message sent by the transmit end. The RRC message carries the processing capability information of the receive end. The transmit end may obtain the processing capability information of the receive end from the RRC message sent by the receive end. For example, assuming that the terminal device 1 sends the data of the V2X application to the terminal device 2, the terminal device 1 is used as the transmit end, the terminal device 2 is used as the receive end, and from a moment at which the terminal device 2 receives the data of the V2X application sent by the terminal device 1 to a moment at which the terminal device 2 sends HARQ information to the terminal device 1, a processing time is two slots, and a processing capability level of the terminal device 2 is the level 2, the terminal device 2 may use a information flow used to indicate "two slots" as processing capability information of the terminal device 2, and send, to the terminal device 1, the RRC message that carries the information flow used to indicate "two slots". Alternatively, the terminal device 2 may send, to the terminal device 1, the information flow that is used to indicate the "level 2" and that is used as the processing capability information of the terminal device 2. This is not limited.

Data transmitted between the transmit end and the receive end may be classified into a plurality of types, and different types of data may be corresponding to different priorities. For example, the transmit end may determine the priority of the data based on a quality of service (quantity of service, QoS) requirement of the data. The QoS requirement may include a transmission rate, a transmission latency, a transmission capacity, and the like. A higher QoS requirement of the data indicates a higher priority of the data. On the contrary, a lower QoS requirement of the data indicates a lower priority of the data. For example, if data 1 requires a low latency and a high transmission rate, but data 2 does not have a high requirement for a latency and requires a low transmission rate, a priority of the data 1 is higher than a priority of the data 2.

In the embodiments of this application, that a transmit end determines a HARQ feedback resource of a receive end based on processing capability information of the receive end and/or a priority of data transmitted between the transmit end and the receive end may include the following three cases: 1. The transmit end determines the HARQ feedback resource of the receive end based on the processing capability information of the receive end. 2. The transmit end determines the HARQ feedback resource of the receive end based on the priority of the data transmitted between the transmit end and the receive end. 3. The transmit end determines the HARQ feedback resource of the receive end based on the processing capability information of the receive end and the priority of the data transmitted between the transmit end and the receive end. Specifically, for implementation processes of the three cases, reference may be made to the following.

Step 302: The transmit end sends indication information to the receive end.

The indication information may be used to indicate the HARQ feedback resource that is of the receive end and that is determined by the transmit end in step 301. For example, the indication information may be an identifier or an index value of the HARQ feedback resource of the receive end.

For example, if the HARQ feedback resource of the receive end is an $(n+4)^{th}$ slot, the transmit end may send n+4 as indication information to the receive end, where n is a positive integer greater than or equal to 0.

Based on the method shown in FIG. 3, the transmit end may determine, based on the processing capability of the receive end, or the priority of the data sent by the transmit end to the receive end, or the processing capability of the receive end and the priority of the data transmitted between the transmit end and the receive end, a resource used by the receive end to feed back HARQ information, so that the receive end feeds back the HARQ information on the resource determined by the transmit end. The method provided in the foregoing embodiment provides a feasible solution for the transmit end to determine the HARQ feedback resource of the receive end, this resolves a prior-art problem that a transmit end cannot determine a HARQ feedback resource of a receive end.

In some embodiments, in the method shown in FIG. 3, that the transmit end determines the HARQ feedback resource of the receive end based on the processing capability information of the receive end may include the following two examples.

Example 1: A processing time from a moment of receiving, by the receive end, data sent by the transmit end to a moment of sending, to the transmit end, HARQ information corresponding to the data is used as processing capability information of the receive end, a processing time of the receive end is used to represent a processing capability of the receive end, and a time-frequency resource that is greater than or equal to the processing time of the receive end is determined as the HARQ feedback resource of the receive end, that is, the HARQ feedback resource of the receive end is greater than or equal to the processing time of the receive end, so as to ensure that the receive end feeds back the HARQ information to the transmit end on a determined HARQ feedback resource after generating the HARQ information. This avoids a problem that the receive end cannot feed back the HARQ information on the determined HARQ feedback resource due to an insufficient processing capability.

The processing time of the receive end may use a subframe as a unit, or use a slot as a unit, or use a symbol (symbol) as a unit, or use a millisecond (ms) or a second (s) as a unit. This is not limited.

It should be noted that, in example 1, a longer processing time of the receive end indicates a weaker processing capability of the receive end and a longer distance between the HARQ feedback resource configured by the transmit end for the receive end and the resource location for receiving data by the receive end. On the contrary, a shorter processing time of the receive end indicates a stronger processing capability of the receive end and a shorter distance between the HARQ feedback resource configured by the transmit end for the receive end and the resource location for receiving data by the receive end. Optionally, if the receive end includes the terminal group, the terminal group includes a first terminal device and a second terminal device, and a processing time of the first terminal device is longer than a processing time of the second terminal device, a time interval between a HARQ feedback resource of the first terminal device and a resource location at which the first terminal device receives a first data may be less than a time interval between a HARQ feedback resource of the second terminal device and a resource location at which the second terminal device receives a second data.

For example, the terminal device 1 sends the data of the V2X application to the terminal device 2 and the terminal device 3, the terminal device 1 is used as the transmit end, and the terminal device 2 and the terminal device 3 are used as receive ends. If a processing time of the terminal device 2 is two slots, and a processing time of the terminal device 3 is three slots, the terminal device 1 sends the data of the V2X application to the terminal device 2 and the terminal device 3 in an nth slot, and the terminal device 2 and the terminal device 3 receive the data of the V2X application in the nth slot, a HARQ feedback resource determined by the terminal device 1 for the terminal device 2 may be an $(n+2)^{th}$ slot, or any slot after the $(n+2)^{th}$ slot, for example, an $(n+3)^{th}$ slot or an $(n+4)^{th}$ slot, and cannot be any slot before the $(n+2)^{th}$ slot (for example, an $(n+1)^{th}$ slot). Because before the $(n+2)^{th}$ slot, the terminal device 1 still does not generate the HARQ information corresponding to the data of the V2X application, and cannot feed back the HARQ information to the terminal device 1. If the HARQ feedback resource determined by the terminal device 1 for the terminal device 2 is a slot before the $(n+2)^{th}$ slot, the terminal device 2 cannot feed back the HARQ information on a specified HARQ feedback resource due to an insufficient processing capability of the terminal device 2. Likewise, a HARQ feedback resource determined by the terminal device 1 for the terminal device 3 may be the $(n+3)^{th}$ slot or any slot after the $(n+3)^{th}$ Slot.

For another example, if the processing time of the terminal device 2 is 4 ms, the time interval between the HARQ feedback resource determined by the terminal device 1 for the terminal device 2 and the time of receiving the data by the terminal device 2 should be equal to or greater than 4 ms, and cannot be less than 4 ms. If the time interval between the HARQ feedback resource determined by the terminal device 1 for the terminal device 2 and the time of receiving the data by the terminal device 2 is greater than 4 ms, for example, 3 ms, the terminal device 2 cannot feed back the HARQ information on the specified HARQ feedback resource due to the insufficient processing capability of the terminal device 2. Likewise, if a processing time of the terminal device 3 is 5 ms, a time interval between the HARQ feedback resource configured by the terminal device 1 for the terminal device 3 and a time at which the terminal device 3 receives data should be equal to or greater than 5 ms.

Example 2: There is a correspondence between the processing capability level of the receive end and a resource pool, and the resource pool may include one or more time-frequency resources. The transmit end may determine a processing capability level of the receive end based on the processing capability information of the receive end. The HARQ feedback resource of the receive end is determined from the resource pool corresponding to the processing capability level of the receive end based on the processing capability level of the receive end and the correspondence. For example, any time-frequency resource in the resource pool may be selected as the HARQ feedback resource of the receive end.

The resource pool and the correspondence between the processing capability level of the receive end and the resource pool may be preconfigured by an access network device for the transmit end. All time-frequency resources included in the resource pool may be used as HARQ feedback resources of the receive end, in other words, the receive end may feed back HARQ information on any time-frequency resource in the resource pool corresponding to the processing capability level of the receive end.

It should be noted that in the embodiments of this application, lengths of the resource pools are the same or different. A start boundary of each resource pool may not be fixed, and the start boundary of the resource pool may be related to a resource location at which the transmit end sends data. For example, the start boundary of the resource pool may be greater than or equal to the resource location at which the transmit end sends data. For example, if the transmit end sends data in a subframe n, the start boundary of the resource pool may be the subframe n, or may be any subframe after the subframe n, for example, a subframe n+k, where k is a positive integer.

Figure 4:
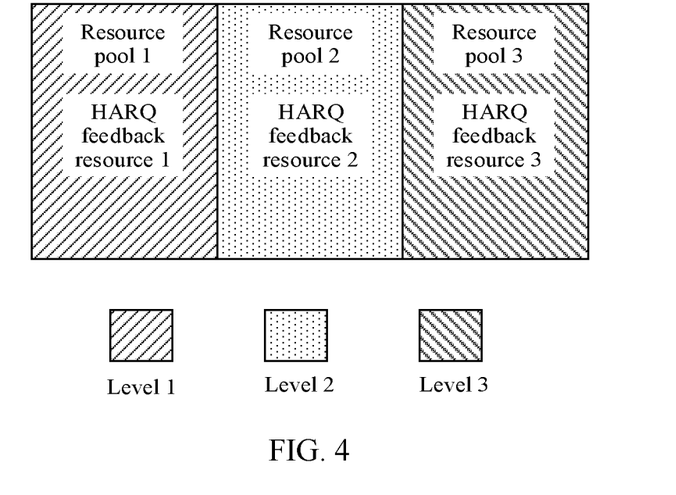
FIG. 4 is a schematic diagram in which a HARQ feedback resource is determined based on a processing capability of an access network device according to an embodiment of this application.

For example, there are three processing capability levels: a level 1, a level 2, and a level 3. A resource pool corresponding to each processing capability level is shown in FIG. 4. If the terminal device 1 sends data to the terminal device 2, and a processing capability level of the terminal device 2 is the level 1, the terminal device 1 may select a HARQ feedback resource 1 from a resource pool 1 as a HARQ feedback resource of the terminal device 2. If the processing capability level of the terminal device 2 is the level 2, the terminal device 1 may select a HARQ feedback resource 2 from a resource pool 2 as the HARQ feedback resource of the terminal device 2. If the processing capability level of the terminal device 2 is the level 3, the terminal device 1 may select a HARQ feedback resource 3 from a resource pool 3 as the HARQ feedback resource of the terminal device 2.

In some embodiments, in the method shown in FIG. 3, in addition to determining the HARQ information of the receive end based on the processing capability information of the receive end, the transmit end may further determine the HARQ feedback resource of the receive end based on other information. For example, the transmit end may further determine the HARQ feedback resource of the receive end based on the priority of the data of the receive end. A higher priority of the data indicates that the determined HARQ feedback resource is closer to a resource location at which the receive end receives the data. On the contrary, a distance from the determined HARQ feedback resource to the resource location of the data received by the receive end is relatively far. The following assumes that the receive end may include a terminal group, and the terminal group may include at least two terminal devices. For example, the terminal group may include a first terminal device and a second terminal device, data transmitted between the transmit end and the first terminal device is first data, and data transmitted between the transmit end and the second terminal device is second data. A process in which the transmit end determines the HARQ feedback resource of the receive end based on the priority of the data of the receive end is described.

When a priority of the first data is higher than a priority of the second data, it indicates that a QoS requirement of the first data is higher than a QoS requirement of the second data, and HARQ information corresponding to the first data should be preferably fed back. A time interval between a HARQ feedback resource of the first terminal device and a resource location at which the first terminal device receives the first data is less than a time interval between a HARQ feedback resource of the second terminal device and a resource location at which the second terminal device receives the second data.

On the contrary, when the priority of the first data is lower than the priority of the second data, it indicates that the QoS requirement of the second data is higher than the QoS requirement of the first data, and HARQ information corresponding to the second data should be preferably fed back. A time interval between a HARQ feedback resource of the first terminal device and a resource location at which the first terminal device receives the first data is greater than a time interval between a HARQ feedback resource of the second terminal device and a resource location at which the second terminal device receives the second data.

Figure 5:
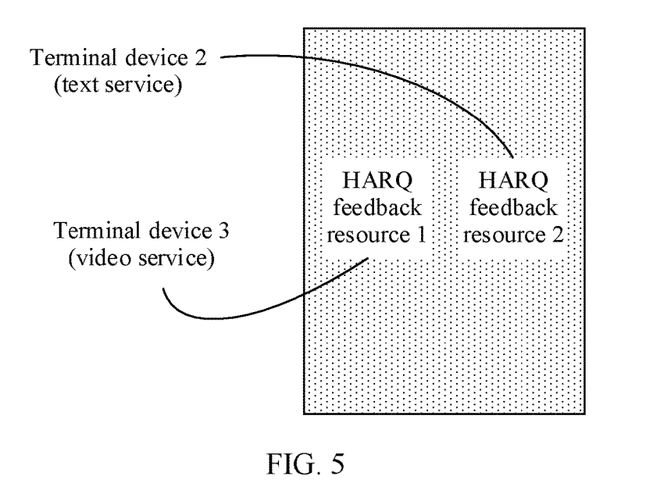
FIG. 5 is still another flowchart of determining a HARQ feedback resource based on a priority of data according to an embodiment of this application.

For example, a terminal device 1 sends data of a text service to a terminal device 2, and the terminal device 1 sends data of a video service to a terminal device 3. Because a priority of the data of the text service is lower than a priority of the data of the video service, as shown in FIG. 5, a HARQ feedback resource 1 with an earlier time domain resource may be configured for the terminal device 3, and a HARQ feedback resource with a later time domain resource may be configured for the terminal device 2.

It should be noted that, in this implementation, to avoid a problem that the receive end cannot send the HARQ information on the HARQ feedback resource configured by the transmit end for the receive end due to an insufficient processing capability of the receive end, the HARQ feedback resource configured by the transmit end for the receive end based on the priority of the data needs to be greater than or equal to a processing time of the receive end.

In some embodiments, in the method shown in FIG. 3, in addition to determining the HARQ feedback resource of the receive end based on the processing capability information of the receive end or the priority of the data transmitted between the receive end and the transmit end, the transmit end may further determine the HARQ feedback resource of the receive end based on the processing capability information of the receive end and the priority of the data transmitted between the receive end and the transmit end. For example, the transmit end may first determine some time-frequency resources based on the processing capability information of the receive end, and then select the HARQ feedback resource of the receive end from the determined time-frequency resource based on the priority of the data transmitted between the receive end and the transmit end.

The following uses an example in which the processing capability information of the receive end is used to indicate a processing capability level of the receive end, there is a correspondence between the processing capability level of the receive end and a resource pool, the receive end includes a terminal group, the terminal group includes a first terminal device and a second terminal device, data transmitted between the transmit end and the first terminal device is first data, and data transmitted between the transmit end and the second terminal device is second data, to describe a case that the transmit end determines the HARQ feedback resource of the receive end based on the processing capability information of the receive end and the priority of the data transmitted between the receive end and the transmit end by using the following case 1 and case 2.

Case 1: Processing capability levels of the first terminal device and the second terminal device are the same, and the processing capability level of the first terminal device and the processing capability level of the second terminal device correspond to a same resource pool. The transmit end determines, based on the processing capability level of the first terminal device and the second terminal device and a correspondence between the processing capability level and a resource pool, a resource pool corresponding to the processing capability level of the first terminal device and the processing capability level of the second terminal device; and then selects a first time-frequency resource from the determined resource pool as a HARQ feedback resource of the first terminal device based on priorities of the first data and the second data, and selects a second time-frequency resource as a HARQ feedback resource of the second terminal device.

When a priority of the first data is higher than a priority of the second data, a time interval between the first time-frequency resource and a resource location at which the first terminal device receives the first data is less than a time interval between the second time-frequency resource and a resource location at which the second terminal device receives the second data. When a priority of the first data is lower than a priority of the second data, a time interval between the first time-frequency resource and a resource location at which the first terminal device receives the first data is greater than a time interval between the second time-frequency resource and a resource location at which the second terminal device receives the second data.

Figure 6:
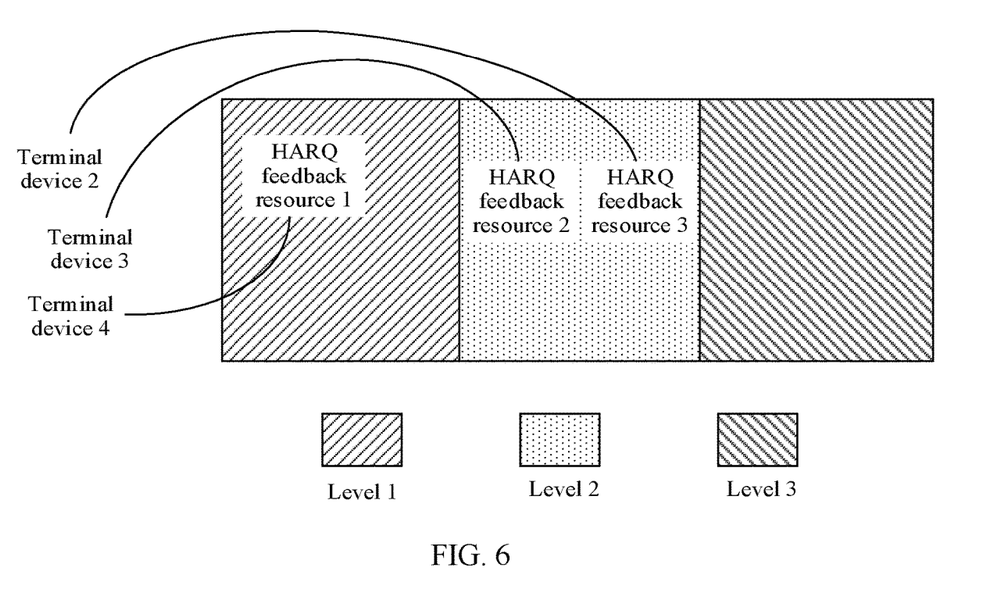
FIG. 6 is a flowchart of determining a HARQ feedback resource based on a processing capability of a receive end and a priority of data according to an embodiment of this application.

For example, a terminal device 1 sends data of a V2X application to a terminal device 2, sends data of a V2V application to a terminal device 3, and sends data of a V2I application to a terminal device 4. A processing capability level of the terminal device 4 is level 1, processing capability levels of the terminal device 2 and the terminal device 3 are level 2, and a priority of the data of the V2X application is lower than a priority of the data of the V2V application. As shown in FIG. 6, the terminal device 1 may select a HARQ feedback resource 1 from a resource pool 1 as a HARQ feedback resource of the terminal device 4, and select HARQ feedback resources of the terminal device 2 and the terminal device 3 from a resource pool 2. For example, the terminal device 1 may configure a HARQ feedback resource 2 with an earlier time domain resource in the resource pool 2 for the terminal device 3, and configure a HARQ feedback resource with a later time domain resource in the resource pool 2 for the terminal device 2.

Case 2: Processing capability levels of the first terminal device and the second terminal device are different, and the processing capability level of the first terminal device and the processing capability level of the second terminal device correspond to different resource pools. The transmit end determines, based on the processing capability level of the first terminal device and a correspondence between the processing capability level and a resource pool, a resource pool corresponding to the processing capability level of the first terminal device, and selects the HARQ feedback resource of the first terminal device from the resource pool. For example, if a priority of the first data is relatively high, a time-frequency resource that is relatively close to a resource location at which the first terminal device receives the data is selected from the resource pool as the HARQ feedback resource of the first terminal device. On the contrary, if a priority of the first data is relatively low, a time-frequency resource that is relatively far away from a resource location at which the first terminal device receives the data is selected from the resource pool as the HARQ feedback resource of the first terminal. Likewise, the transmit end determines, based on the processing level of the second terminal device and a correspondence between the processing capability level of the second terminal device and a resource pool, a resource pool corresponding to the processing capability level of the second terminal device, and selects the HARQ feedback resource of the second terminal device from the resource pool. For example, any time-frequency resource may be selected from the resource pool as the HARQ feedback resource of the second terminal device.

For example, the level 1 corresponds to the resource pool 1, and the level 2 corresponds to the resource pool 2. It is assumed that the terminal device 1 sends the data of the V2X application to the terminal device 2, and sends the data of the V2V application to the terminal device 3. A processing capability level of the terminal device 2 is the level 1, and a processing capability level of the terminal device 3 is the level 2. In this case, the terminal device 1 may select a HARQ feedback resource of the terminal device 2 from the resource pool 1, and select a HARQ feedback resource of the terminal device 3 from the resource pool 2. If the data that is of the V2X application and that is sent by the terminal device 1 to the terminal device 2 is a text and has a relatively low priority, the terminal device 1 may configure a HARQ feedback resource with a later time domain resource in the resource pool 1 for the terminal device 2. If the data that is of the V2X application and that is sent by the terminal device 1 to the terminal device is a video and has a relatively high priority, the terminal device 1 may configure a HARQ feedback resource with an earlier time domain resource in the resource pool 1 for the terminal device 2.

In the foregoing case 1 and case 2, a process in which the transmit end determines the HARQ feedback resource is described by using an example in which the processing capability information of the receive end is used to indicate the processing capability level of the receive end. It may be understood that, when the processing capability information of the receive end is used to indicate the processing time of the receive end, the transmit end may also determine the HARQ feedback resource of the receive end with reference to the foregoing case 1 and case 2. For example, if a processing time of the first terminal device is the same as a processing time of the second terminal device, the transmit end determines the HARQ feedback resource of the first terminal device and the HARQ feedback resource of the second terminal device based on the priorities of the first data and the second data. When the priority of the first data is higher than the priority of the second data, a time interval between the HARQ feedback resource of the first terminal device and a resource location at which the first terminal device receives the first data is less than a time interval between the HARQ feedback resource of the second terminal device and a resource location at which the second terminal device receives the second data. When the priority of the first data is lower than the priority of the second data, the time interval between the HARQ feedback resource of the first terminal device and the resource location at which the first terminal device receives the first data is greater than the time interval between the HARQ feedback resource of the second terminal device and the resource location at which the second terminal device receives the second data.

If the processing time of the first terminal device is different from the processing time of the second terminal device, a time interval between the HARQ feedback resource of the first terminal device and the resource location at which the first terminal device receives the first data is equal to or greater than the processing time of the first terminal device, and a time interval between the HARQ feedback resource of the second terminal device and the resource location at which the second terminal device receives the second data is equal to or greater than the processing time of the second terminal device. In addition, if the priority of the first data is relatively high, the HARQ feedback resource of the first terminal device is relatively close to the resource location at which the first terminal device receives the data. On the contrary, if the priority of the first data is relatively low, the HARQ feedback resource of the first terminal device is relatively far away from the resource location at which the first terminal device receives the data. Likewise, if the priority of the second data is relatively high, the HARQ feedback resource of the second terminal device is relatively close to the resource location at which the second terminal device receives the data. On the contrary, if the priority of the second data is relatively low, the HARQ feedback resource of the second terminal device is relatively far away from the resource location at which the second terminal device receives the data.

Further, in the method shown in FIG. 3, the method may further include: The transmit end receives HARQ information sent by the receive end on the HARQ feedback resource determined by the transmit end. In this way, accuracy of receiving the HARQ information by the transmit end can be ensured.

For example, if the HARQ feedback resource determined by the terminal device 1 for the terminal device 2 is the $(n+4)^{th}$ slot, the terminal device 1 may receive the HARQ information sent by the terminal device 2 in the $(n+4)^{th}$ slot.

The foregoing mainly describes the solutions provided in the embodiments of this application from a perspective of interaction between nodes. It may be understood that, to implement the foregoing functions, each node, such as the transmit end, includes a corresponding hardware structure and/or software module for performing each function. A person of ordinary skill in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the transmit end may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. It should be noted that, in the embodiments of this application, module division is an example, and is merely a logical function division. In actual implementation, another division manner may be used.

Figure 7:
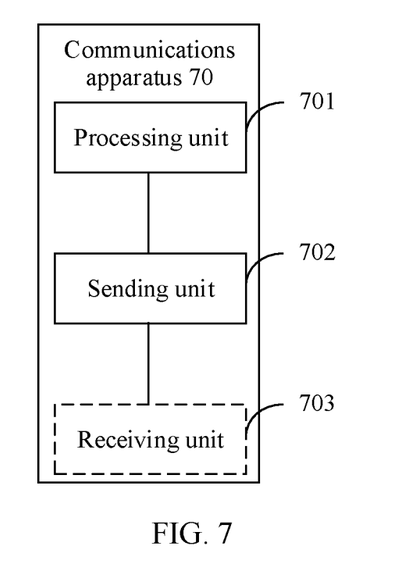
FIG. 7 is a schematic structural diagram of a communications apparatus 40 according to an embodiment of this application.

FIG. 7 is a schematic structural diagram of a communications apparatus 70 according to the embodiments of this application. The communications apparatus in the embodiments may be a transmit end, or a chip or a system on chip in a transmit end. The communications apparatus 70 may be configured to perform a function of the transmit end in the foregoing method embodiment. In an implementation, as shown in FIG. 7, the communications apparatus 70 may include a processing unit 701 and a sending unit 702.

The processing unit 701 is configured to determine a HARQ feedback resource of a receive end based on processing capability information of the receive end and/or a priority of data transmitted between the communications apparatus and the receive end. The HARQ feedback resource of the receive end is used to carry HARQ information corresponding to the data transmitted between the communications apparatus and the receive end, for example, the processing unit 701 may be used to support the communications apparatus 70 in performing step 301.

The sending unit 702 is configured to send indication information to the receive end. The indication information is used to indicate the HARQ feedback resource of the receive end. For example, the sending unit 702 may be used to support the communications apparatus 70 in performing step 302.

Further, as shown in FIG. 7, the communications apparatus 70 may further include a receiving unit 703.

The receiving unit 703 is configured to receive, on the HARQ feedback resource of the receive end, the HARQ information.

Specifically, the communications apparatus 70 provided in the embodiments of this application may perform actions of the transmit end in the method embodiment corresponding to FIG. 3. Implementation principles and technical effects thereof are similar, and details are not described herein again.

In another possible implementation, the communications apparatus 70 shown in FIG. 7 may include a processing module and a communications module. The processing module may integrate a function of the processing unit 701, and the communications module may integrate functions of the receiving unit 702 and the sending unit 703. The processing module is configured to support the communications apparatus 70 in performing step 301 and controlling and managing an action of the communications apparatus 70. The communications module is configured to support the communications apparatus 70 in performing step 302 and communicating with another network entity. Further, the communications apparatus 70 shown in FIG. 7 further includes a storage module, configured to store program code and data of the communications apparatus 70.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module may be a transceiver circuit, a communications interface, or the like. The storage module may be a memory. When the processing module is a processor, the communications module is a communications interface, and the storage module is a memory, the communications apparatus 70 shown in FIG. 7 may be the communications apparatus shown in FIG. 2.

Figure 8:
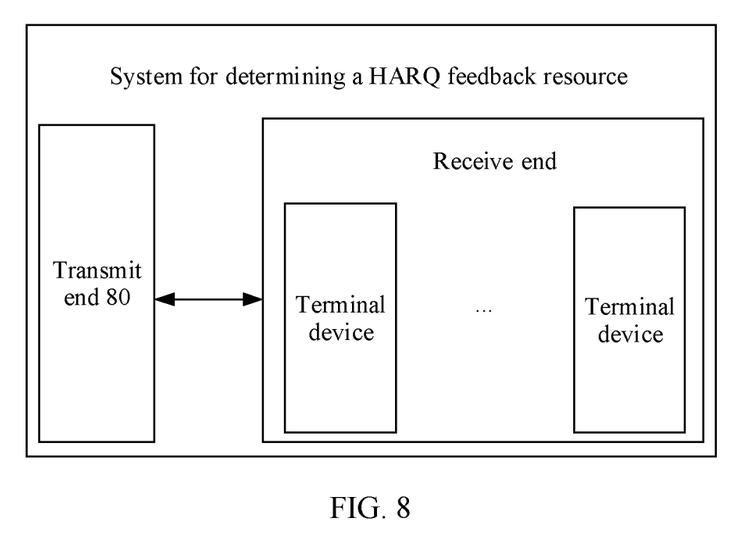
FIG. 8 is a schematic structural diagram of a system for determining a HARQ feedback resource according to an embodiment of this application.

FIG. 8 is a schematic structural diagram of a communications system according to the embodiments of this application. As shown in FIG. 8, the communications system may include a transmit end 80 and a receive end.

A function of the transmit end 80 is the same as that of the communications apparatus 70 shown in FIG. 7. For example, the transmit end 80 may be configured to: determine a HARQ feedback resource of the receive end based on processing capability information of the receive end and/or a priority of data transmitted between the communications apparatus and the receive end, and send indication information to the receive end. The indication information is used to indicate the HARQ feedback resource of the receive end.

Specifically, the communications system provided in the embodiments of this application may perform the method embodiments corresponding to FIG. 3 to FIG. 6. Implementation principles and technical effects thereof are similar, and details are not described again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented based on a requirement, in other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes various media that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
   selecting, from a resource pool corresponding to a processing capability level of a receive end, a hybrid automatic repeat request (HARQ) feedback resource of the receive end based on the processing capability level, a preconfigured correspondence between the processing capability level and the resource pool, and a first priority of first data transmitted between a transmit end and the receive end according to a quality of service (QoS) requirement of the first data, wherein the resource pool comprises one or more time-frequency resources, wherein the HARQ feedback resource carries HARQ information corresponding to the first data, and wherein the HARQ feedback resource comprises a time-frequency resource for the receive end to perform HARQ feedback; and
   sending, to the receive end, indication information indicating the HARQ feedback resource.

2. The method of claim 1, wherein processing capability information of the receive end comprises the processing capability level and indicates a processing time of the receive end from a first moment of receiving second data from the transmit end to a second moment of sending, to the transmit end, the HARQ information.

3. The method of claim 2, wherein a time interval between the HARQ feedback resource and a resource location at which the receive end receives the second data is greater than or equal to the processing time.

4. The method of claim 1, wherein processing capability information of the receive end comprises the processing capability level and indicates the processing capability level of the receive end from a first moment of receiving second data from the transmit end to a second moment of sending, to the transmit end, the HARQ information.

5. The method of claim 4, wherein a first terminal device in the receive end comprises a first processing capability level, wherein a second terminal device in the receive end comprises a second processing capability level, and wherein a first time interval between a first HARQ feedback resource of the first terminal device and a first resource location at which the first terminal device receives second data from the transmit end is less than a second time interval between a second HARQ feedback resource of the second terminal device and a second resource location at which the second terminal device receives third data from the transmit end when a first processing capability of the first terminal device is higher than a second processing capability of the second terminal device.

6. The method of claim 1, further comprising:
transmitting second data to a first terminal device in the receive end; and
transmitting third data to a second terminal device in the receive end,
wherein a first time interval between a first HARQ feedback resource of the first terminal device and a first resource location at which the first terminal device receives the second data is less than a second time interval between a second HARQ feedback resource of the second terminal device and a second resource location at which the second terminal device receives the third data when a second priority of the second data is higher than a third priority of the third data.

7. The method of claim 1, further comprising receiving, on the HARQ feedback resource and from the receive end, the HARQ information.

8. The method of claim 1, comprising receiving, from the receive end, a Radio Resource Control (RRC) message carrying processing capability information of the receive end.

9. A communications apparatus, comprising:
a memory configured to store program instructions; and
a processor coupled to the memory, wherein the program instructions cause the processor to be configured to:
select, from a resource pool corresponding to a processing capability, a hybrid automatic repeat request (HARQ) feedback resource of the receive end based on the processing capability level, a preconfigured correspondence between the processing capability level and the resource pool, and a first priority of first data transmitted between a transmit end and the receive end according to a quality of service (QoS) requirement of the first data, wherein the resource pool comprises one or more time-frequency resources, wherein the HARQ feedback resource carries HARQ information corresponding to the first data, and wherein the HARQ feedback resource comprises a time-frequency resource for the receive end to perform HARQ feedback; and
send to the receive end, indication information indicating the HARQ feedback resource.

10. The communications apparatus of claim 9, wherein processing capability information of the receive end comprises the processing capability level and indicates a processing time of the receive end from a first moment of receiving second data from the communications apparatus to a second moment of sending, to the communications apparatus, the HARQ information.

11. The communications apparatus of claim 10, wherein a time interval between the HARQ feedback resource and a resource location at which the receive end receives the second data is greater than or equal to the processing time.

12. The communications apparatus of claim 9, wherein processing capability information of the receive end comprises the processing capability level and indicates the processing capability level of the receive end from a first moment of receiving second data from the communications apparatus to a second moment of sending, to the communications apparatus, the HARQ information.

13. The communications apparatus of claim 12, wherein a first terminal device in the receive end comprises a first processing capability level, wherein a second terminal device in the receive end comprises a second processing capability level, and wherein a first time interval between a first HARQ feedback resource of the first terminal device and a first resource location at which the first terminal device receives second data from the communications apparatus is less than a second time interval between a second HARQ feedback resource of the second terminal device and a second resource location at which the second terminal device receives third data from the communications apparatus when a first processing capability of the first terminal device is higher than a second processing capability of the second terminal device.

14. The communications apparatus of claim 9, wherein the program instructions further cause the processor to be configured to:
transmit second data to a first terminal device in the receive end; and
transmit third data to a second terminal device in the receive end,
wherein a first time interval between a first HARQ feedback resource of the first terminal device and a first resource location at which the first terminal device receives the second data is less than a second time interval between a second HARQ feedback resource of the second terminal device and a second resource location at which the second terminal device receives the third data when a second priority of the second data is higher than a third priority of the third data.

15. The communications apparatus of claim 9, wherein the program instructions further cause the processor to be configured to receive, on the HARQ feedback resource and from the receive end, the HARQ information.

16. The communications apparatus of claim 9, wherein the program instructions further cause the processor to be configured to receive, from the receive end, a Radio Resource Control (RRC) message carrying processing capability information of the receive end.

17. A computer program product comprising computer-executable instructions stored on a non-transitory computer-readable medium that, when executed by a processor, cause an apparatus to:
select, from a resource pool corresponding to the processing capability, a hybrid automatic repeat request (HARQ) feedback resource of the receive end based on the processing capability level, a preconfigured correspondence between the processing capability level and the resource pool, and a first priority of first data transmitted between a transmit end and the receive end according to a quality of service (QoS) requirement of the first data, wherein the resource pool comprises one or more time-frequency resources, wherein the HARQ feedback resource carries HARQ information corresponding to the first data, and wherein the HARQ feedback resource comprises a time-frequency resource for the receive end to perform HARQ feedback; and send to the receive end, indication information indicating the HARQ feedback resource.

18. The computer program product of claim 17, wherein processing capability information of the receive end comprises the processing capability level and information indicates a processing time of the receive end from a first moment of receiving data from the apparatus to a second moment of sending, to the apparatus, the HARQ information.

19. The computer program product of claim 18, wherein a time interval between the HARQ feedback resource and a resource location at which the receive end receives the second data is greater than or equal to the processing time.

20. The computer program product of claim 17, wherein processing capability information of the receive end comprises the processing capability level and indicates the processing capability level of the receive end from a first moment of receiving second data from the communications apparatus to a second moment of sending, to the communications apparatus, the HARQ information.

* * * * *